March 4, 1924.

M. S. LIGNOSKI

PIPE HOLDER

Original Filed Feb. 13, 1922

1,485,683

Inventor
Milton S. Lignoski

By Hardway Mathey
Attorneys

Patented Mar. 4, 1924.

1,485,683

UNITED STATES PATENT OFFICE.

MILTON S. LIGNOSKI, OF HOUSTON, TEXAS, ASSIGNOR TO G. R. LIVERGOOD.

PIPE HOLDER.

Application filed February 13, 1922, Serial No. 536,138. Renewed June 29, 1923.

*To all whom it may concern:*

Be it known that I, MILTON S. LIGNOSKI, citizen of the United States, residing at Houston, in the county of Harris and State of Texas, have invented certain new and useful Improvements in a Pipe Holder, of which the following is a specification.

This invention relates to new and useful improvements in a pipe holder, the subject matter hereof being in part divided out of the application of this applicant on a pipe holder filed January 3, 1921, Serial No. 434,590.

One object of the invention is to provide a pipe engaging slip which is adapted to be inserted in a rotary around the pipe to be held and which will clamp and hold the pipe against turning or against dropping into the bore.

A further feature of the invention resides in the provision of a slip which is formed of sections so united together that the slip will readily conform to and engage with the pipe on all sides, thus securely holding the pipe and insuring it against dropping into the bore.

The device is particularly adapted for use in holding a string of pipe suspended in the bore when the string is being broken up in the operation of withdrawal, or being made up as it is being let down in the bore.

With the above and other objects in view the invention has particular relation to certain novel features of construction, operation and arrangement of parts, an example of which is given in this specification and illustrated in the accompanying drawings, wherein:—

Figure 1:
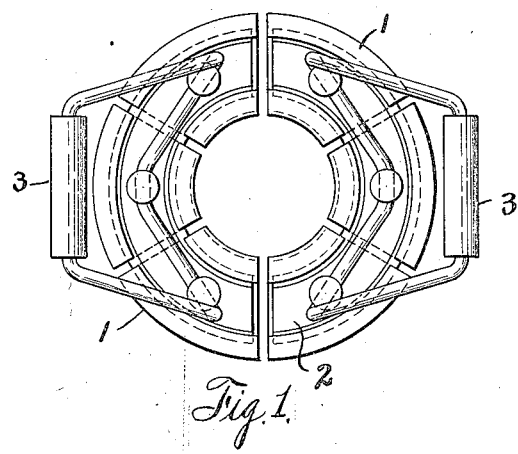
Figure 1 is a plan view of the device.
Figure 2:
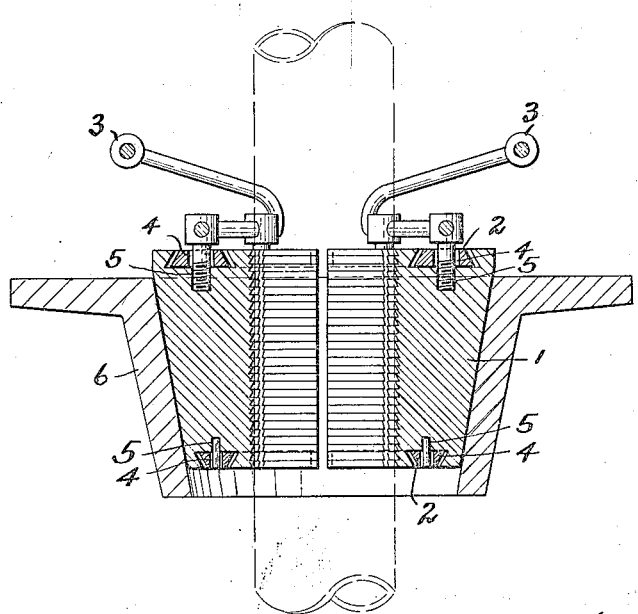
Figure 2 is a vertical sectional view.

Referring now more particularly to the drawings, the numeral 1 refers to the arcuate sections of the slip, as shown there are six of these and three on each side are united together by means of the stays 2, 2 which are dove tailed into the upper and lower ends, respectively of the respective sections and are pinned therein, as shown.

Each unit is provided with a handle 3 by means of which it can be manipulated. The stays 2 have slots, as 4, therethrough and securing pins 5 pass therethrough and are driven or threaded into bores in the ends of the slip sections, provided for them. The handles 3 are fastened to the pins at the upper ends of the slip section, as shown. The inner sides of the sections are toothed to engage with the pipe. It is to be observed that the sections 1 are tapered downwardly, that is, they are wedge shaped in form, so that they will wedge in the spider 6, between it and the pipe and will grip and hold said pipe. The pins 5 fit loosely through the openings 4 so as to permit a certain amount of movement of the slip sections on said stays so as to permit the slip to adjust itself to the countour of the pipe and engage therewith all the way around thus securing a better hold on the pipe.

What I claim is:

1. A pipe holding device including a circular inwardly tapering wall, segmental jaws, independent members passing through said jaws at their respective ends, and joining them loosely together.

2. A pipe suspending device composed of a rounded inwardly tapering spider, a plurality of arcuate segmental jaws, independent arcuate members carried by said jaws at their ends and holding them loosely together.

3. A pipe engaging device consisting of a downwardly tapering spider, a plurality of wedge shaped jaws, independent arcuate members passing within the upper and lower ends of said jaws and allowing a certain amount of lateral movement of said jaws.

4. A pipe holding device composed of an inverted conical spider, a plurality of arcuate units within said spider, said units being divided radially into lesser wedge shaped segments, some of said segments having their inner surfaces horizontally toothed, independent arcuate members passing through said segments at their opposite ends combining them into said units and allowing an independent movement of said segments relative to said units and to each other.

In testimony whereof I have signed my name to this specification in the presence of two subscribing witnesses.

MILTON S. LIGNOSKI.

Witnesses:
JAS. W. OLIVER,
E. V. HARDWAY.